United States Patent [19]
Faust et al.

[11] Patent Number: 5,752,159
[45] Date of Patent: May 12, 1998

[54] METHOD FOR AUTOMATICALLY COLLECTING AND DELIVERING APPLICATION EVENT DATA IN AN INTERACTIVE NETWORK

[75] Inventors: John E. Faust, Boulder; John R. Meier, Longmont, both of Colo.

[73] Assignee: U S West Technologies, Inc., Boulder, Colo.

[21] Appl. No.: 372,153

[22] Filed: Jan. 13, 1995

[51] Int. Cl.$^6$ .............................. H04H 1/00; H04N 7/14; H04B 17/00

[52] U.S. Cl. ..................... 455/5.1; 358/2; 358/12; 455/2

[58] Field of Search ................... 348/7, 12, 13, 348/1.2, 10, 6; 455/5.1, 3.1, 4.1, 4.2, 6.1, 2; 395/200.47, 200.48, 200.49; H04N 7/14, 7/10, 7/173

[56] References Cited

U.S. PATENT DOCUMENTS 5,357,276  10/1994  Banker et al. .............................. 348/7
5,410,344  4/1995  Graves et al. .............................. 348/1

Primary Examiner—John K. Peng
Assistant Examiner—John W. Miller
Attorney, Agent, or Firm—Brooks & Kushman

[57] ABSTRACT

A method is disclosed for automatically collecting and delivering multimedia application event data in an interactive network. The interactive network includes a server and a plurality of client stations. In operation, an event of a multimedia application at a first client station is identified. An event data signal representing the event is then transmitted and received by the server. The server processes the event data signal to determine if it is interested in the event. The server stores the event data signal if it is interested in the event. The server also allows other client stations to register an interest in the event. Upon determining an event of interest to a client station, the server automatically delivers the event data representing the event to the interested client station.

6 Claims, 2 Drawing Sheets

METHOD FOR AUTOMATICALLY COLLECTING AND DELIVERING APPLICATION EVENT DATA IN AN INTERACTIVE NETWORK

CROSS-REFERENCE TO RELATED APPLICATIONS

This application is related to copending U.S. patent application Ser. Nos. 08/372,152, 08/372,158, 08/372,159 and 08/372,157, filed concurrently with the present application, respectively entitled "METHOD AND SYSTEM FOR PRELOADING INTERACTIVE MULTIMEDIA APPLICATIONS", "METHOD AND SYSTEM FOR DESCRIBING AN INTERACTIVE MULTIMEDIA APPLICATION", "METHOD FOR DEVELOPING MULTIMEDIA APPLICATIONS" and "METHOD AND SYSTEM FOR MANAGING AND PRODUCING MULTIMEDIA ASSETS", which are commonly assigned to the assignee of the present application, and which are hereby incorporated by reference.

TECHNICAL FIELD

This invention relates generally to methods and systems for collecting and delivering information over an interactive television network. In particular, this invention relates to methods and systems for automatically collecting and delivering semantic event data to an application in an interactive television network.

BACKGROUND ART

Emerging interactive television networks require event data to be collected from a variety of sources. One source at which an event can occur is a set top terminal. Typically, the set top terminal is located in the home of the user and includes an input device such as an infrared remote controller. An event is generated by a user when the user presses a button on the remote controller.

Prior art interactive television networks include custom event collection logic specifically developed to operate on a particular set top terminal make and model. The custom event collection logic forms part of an interactive application and is typically implemented in a low level language such as C or assembly language.

As a consequence of its low-level and customized nature, such logic is not only time consuming to develop but also difficult to support. Further, the prior art event collection and delivery logic is primarily intended to collect and deliver only raw event data.

In many applications, it is advantageous to collect and deliver high-level semantic information in addition to the low-level raw event data. Using the prior art methods and systems, collecting and delivering semantic information requires additional custom logic.

In other applications, it is advantageous to maintain a persistent record of both raw event data and semantic information. Again, using the prior art methods and systems, this would require additional custom logic.

DISCLOSURE OF THE INVENTION

In view of the prior art, a need exists for a method and system which automatically collects and delivers event data to an application at a set top terminal in an interactive television network. More particularly, the method and system must overcome the shortcomings of the prior art.

It is an object of the present invention to provide a method and system for automatically collecting and delivering event data within an interactive television network which can be implemented in a high-level language.

It is another object of the present invention to provide a method and system for automatically collecting and delivering both raw event data and semantic event information within an interactive television network.

It is yet another object of the present invention to provide a method and system for automatically collecting and delivering event information within an interactive television network which produces a persistent record of both raw event data and semantic event information.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
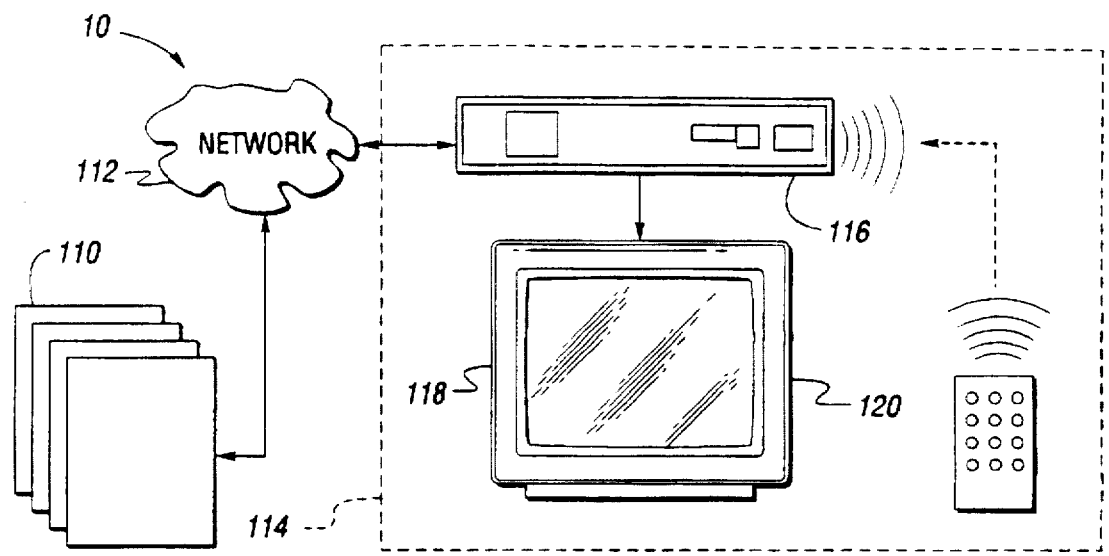
FIG. 1 is a schematic block diagram of the environment in which the present invention is used.

Referring now to the drawings, FIG. 1 is a schematic block diagram illustrating an interactive television ("ITV") system 10 for use with the present invention. System 10 includes at least one ITV server 110 for use with an ITV network 112. ITV server 110 is connected through ITV network 112 with client station 114.

There are a number of equipment manufacturers who produce commercially available equipment which could function as ITV server 110. In fact, the control logic employing the method of the present invention has been successfully implemented on DEC Alpha AXP processors running DEC OSF/1; SGI mips-based processors running IRIX; and SUN processors running SunOS.

The control logic has been implemented in both C and C++. If necessary, it could be easily ported to other UNIX platforms.

Client station 114 includes set top terminal 116, television 118 and remote controller 120. Preferably, set top terminal 116 would be either a Time-Warner full service network Home Communications Terminal ("HCT") or a 3DO set top terminal. The Time Warner HCT employs a MIPS R4000 chip running at 80–100 Mhz and incorporates Silicon Graphics Indigo Workstation components.

The 3DO set top terminal employs a proprietary 3DO chip set. The control logic communicating with the 3DO set top terminals conform to the 3DO RPC Folio, as described in the "3DO Network Developer's Guide—Preliminary Draft", dated July, 1994.

Both terminals, Time Warner and 3DO, are capable of receiving digital full-motion video, animation, graphics and audio data. Both terminals are further capable of converting this digital information into an analog signal for transmission to television 118.

Client station 114 further includes an input device 120. Preferably input device 120 is an infrared remote control including a number of alpha-numeric keys. Alternatively, input device 120 could be an infrared mouse.

As those skilled in the art will recognize, system 10 is an interactive television network employing a client-server architecture. ITV server 110 provides mass storage and services to client station 114. Control logic resides at both server 110 and client station 114 to support the client-server architecture.

Figure 2:
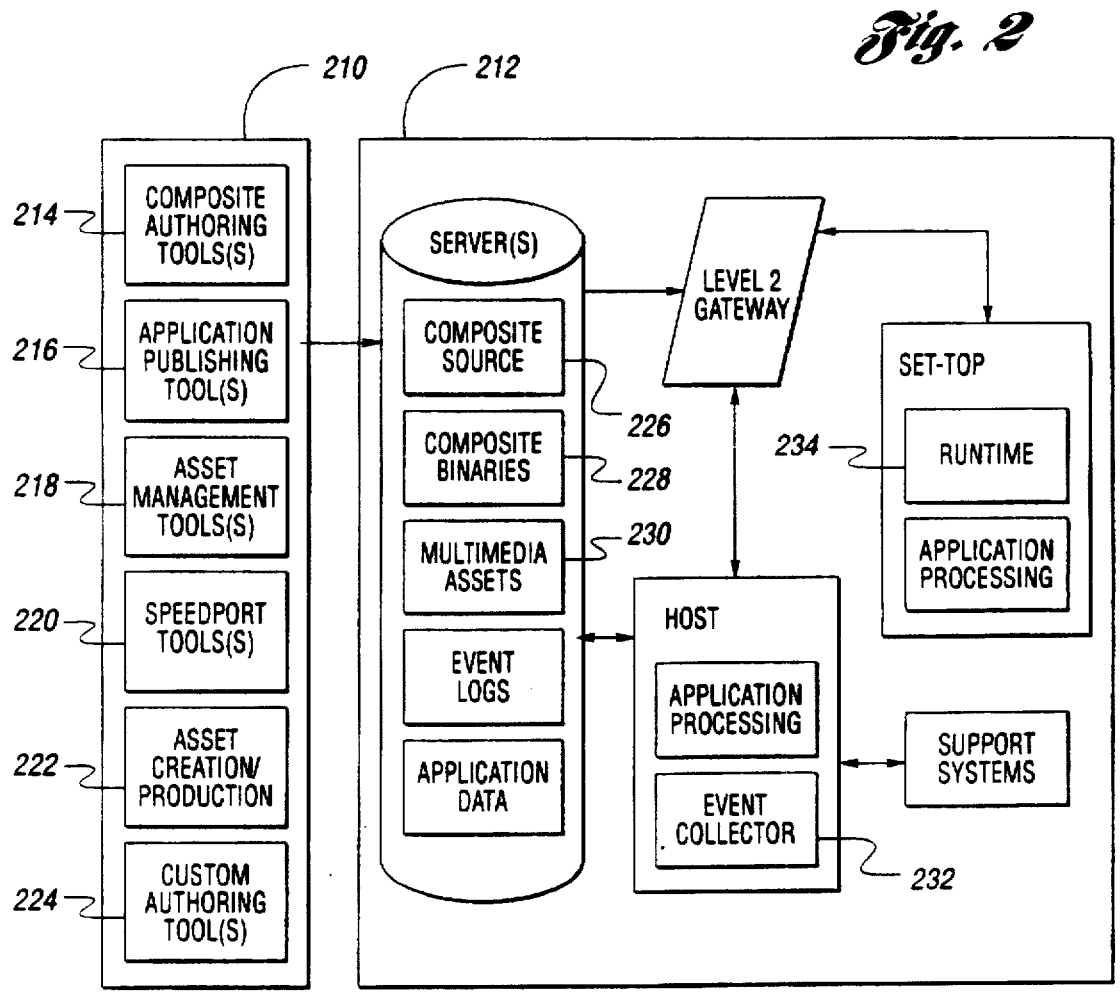
FIG. 2 is a schematic block diagram illustrating the preferred architecture of an interactive television network employing the event collection method of the present invention.

Referring now to FIG. 2, there is shown a schematic block diagram illustrating the architecture of the Information Services Infra-Structure ("ISIS") employing the event collection method of the present invention. ISIS provides a set of interoperable software tools for developing and executing interactive multimedia applications for delivery on a variety of consumer electronic devices over a variety of broadband networks.

The ISIS architecture includes two categories of software components: development components 210 and runtime components 212. Development components 210 include authoring and application publishing tools for building a multimedia application. The authoring tools work with existing asset creation and production tools such as Adobe Photoshop, Adobe Premier, and SoundEdit Pro which can be used to create videos, graphics, audio, and fonts. An authored application can be compiled and tested in either a standalone Macintosh configuration or a client/server environment over a network. The application publishing tools move the application from a standalone environment to a server environment and to the eventual deployment/production environment.

The ISIS Runtime components 212 are responsible for executing an authored application. ISIS runtime 212 provides the execution environment for the application in a client/server environment where the client device is a consumer set top terminal. In order to support emerging consumer set top terminals, as well as Macintoshes and PCs, the compiled application is portable.

The initial focus of ISIS was to deliver 3DO Runtime software for the US WEST Broadband network trial in Omaha, Neb., in the fourth quarter of 1994. A Macintosh version of the runtime components is also supported to allow initial testing of applications without expensive 3DO or DEC development hardware and software.

Composite Authoring Tool (CAT)

CAT 214 is an authoring tool that runs on the Macintosh and defines the compositing of multimedia assets (i.e. video, graphics, audio, and text) into interactive multimedia applications. CAT 214 provides an integrated graphical layout editor, a forms editor, and a testing environment.

With the layout editor, display objects can be easily defined and laid out in a window that represents a television screen. Each display object also has a detail forms window in which additional object attributes can be specified.

CAT 214 provides a seamless testing environment on the Macintosh which is integrated with a composite compiler and the Macintosh version of the Runtime. CAT 214 invokes the composite compiler to compile the composite, and then invokes the Runtime to play back the composite. A new composite can be created and tested with a few clicks of the mouse.

CAT 214 delivers a source composite definition 226 and a binary composite definition 228 as output in Composite Description Language (CDL). CDL provides an event driven, object oriented syntax for defining a multimedia application.

Composites, composite items, events, actions, and templates are the building blocks of CDL and any application built in ISIS.

A composite is a collection of assets, events and actions assembled into a "scene" that the ISIS Runtime 212 plays back. Composites can also contain other composites. To describe interactivity, a composite defines how to handle external events such as button presses on a remote control.

A composite item is a multimedia object (i.e. video, graphic, text, audio, animation or custom library) within a composite. Attributes such as screen location, transparency and audio and video looping further define composite items.

An event is an occurrence to which an application must react. Events can occur externally or internally to the ISIS Runtime. Button presses on a remote control are external events. The passage of time, entering a composite and starting a stream are internal events.

As ISIS Runtime 212 plays back a composite, it also monitors events as they occur. When an event occurs that is of interest to the executing composite, the ISIS Runtime 212 executes the actions associated with that event. An event always has at least one action associated with it.

CDL has predefined actions that the ISIS Runtime player can perform. For example, a common action for composite items is "enable." The enable action tells the ISIS Runtime to display a graphic, play an audio file, etc.

Another common action is "transition to:composite" which tells the ISIS Runtime to execute the composite defined by the "transition to" action. In effect, these transitions link composites together into an application. In addition to the predefined actions that ISIS provides, a developer can write and add custom actions.

Composites can also be templates. Any composite can take its composition from another composite simply by referencing that composite as a template. Composites inherit (using a delegation mechanism) all items, events, and actions from a template.

Application Publishing

The ISIS application publishing tools 216 are utilities that move an application between test environments and the deployment environment. These tools move all the objects of an ISIS application including composites, video, graphic and audio files, fonts, and custom code.

Application publishing tools 216 examine composite descriptions, determine all the files that support the composites, and move the application to a staging area such as tape or disk. From the staging area, the application can be moved to a variety of environments.

ISIS also supports incremental publishing. Using incremental publishing, only those objects that have been altered since the last publishing of the application are moved. This lets the developer add new features and change content quickly.

Asset Management and Production System (AMPS)

The ISIS Asset Management and Production System (AMPS) 218 provides a set of tools for managing multimedia assets 230 and ISIS applications. AMPS 218 provides multimedia title developers with an easy and convenient way to catalog assets, perform keyword searches on assets, archive assets and publish applications. AMPS 218 moves applications and assets from a development environments to the deployment environments.

Speedport Tools

Speedport 220 is a component of the ISIS tool set that transforms existing multimedia applications into ISIS applications. Speedport 220 provides tools to systematically extract multimedia assets from existing titles and to register those assets with AMPS. Speedport 220 also provides a methodology and practical guidance for converting the application into an ISIS application.

Speedport 220 speeds up the conversion of any existing multimedia application. Speedport 220 accepts a variety of digital media including CD-ROM, magnetic disk, optical drives, and digital tape.

Speedport 220 also defines a methodology or set of practices for porting application to the ISIS environment. This methodology guides the developer through the steps of moving application components from the existing environment into ISIS.

The ISIS development environment 210 finally includes an interface to standard facilities such as asset creation/production 222 and custom authoring tools 224.

ISIS Runtime

ISIS runtime 212 reads and plays back composite binary files 228 defined during the authoring process. It reads the startup composite, waits for events to occur, and then executes the actions associated with those events.

There are three major processing components of the ISIS Runtime: the player, the preloader and the event collector.

As the heart of the Runtime, the player handles the display and playback of composite items, monitors and handles events as they occur, performs actions, and communicates with the preloader and event collector as needed.

The preloader provides the Runtime with an overall memory management and caching scheme whose purpose is to improve performance and to hide latency. When an application starts and the player invokes the first composite, the preloader retrieves all of the files necessary to play the composite. It then looks at the composite and loads the "next" composites based on the transitions defined in the composite that is playing.

The event collector 232 stores all internal and external events, as they occur, in a buffer in memory at the set top terminal. These events can be sent to event collector 310 on the server for logging to a file 314 or for additional processing.

ISIS Event Collector Subsystem

Figure 3:
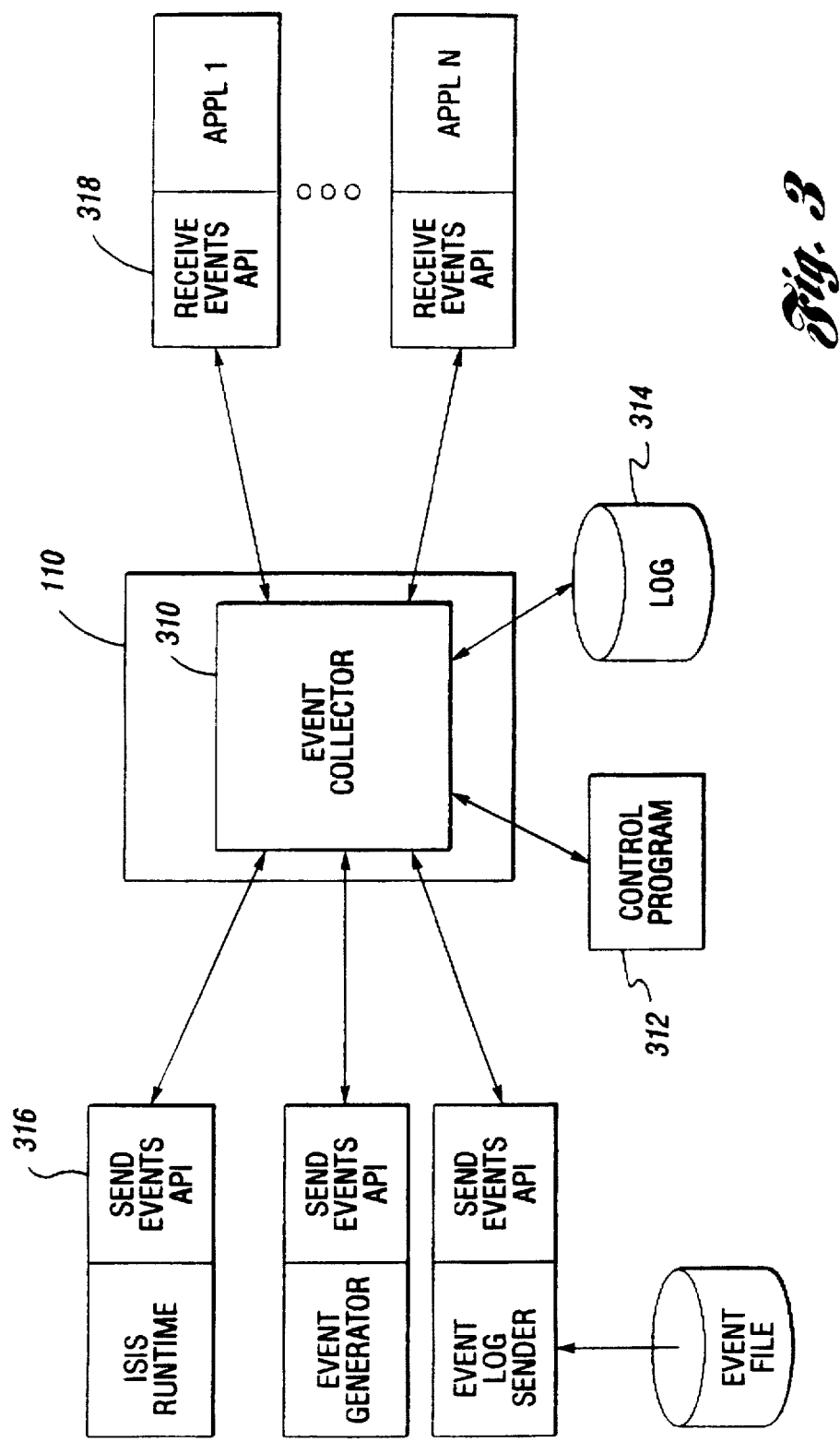
FIG. 3 is a schematic block diagram illustrating the event collection logic employing the method of the present invention.

Referring now to FIG. 3, there is illustrated the preferred event collector subsystem employing the method of the present invention. The ISIS event collector subsystem is a distributed server based application based on a client/server model. The subsystem provides two primary services:

1. It allows the client application to send and post events to a central location on a server.

2. It allows the client application to register its interest for all or specific events. Events sent to the Event Collector are filtered and passed through to the appropriate registered application.

ISIS Event Collector (Server)

The event collector component 310 is the core of the system. Event collector 310 resides on a server and receives events posted by a remote event-posting application typically at set top terminal 116. After receiving an event, event collector 310 dispatches the event to a remote event-handling application (e.g., the IM2 OSS component).

Event collector 310 listens for commands from control program 312, and responds to those commands. Further, event collector 310 filters out events deemed uninteresting by the system administrator and provides temporary persistent storage for undeliverable events.

Event collector 310 maintains an ascii log file 314 into which it writes items of interest. Such items may include status, performance, and error information. ISIS Runtime can use the event logs to play back an application session exactly as it appeared to the end user.

If problems occur in the system, log file 314 is designed to provide the support organization with a starting point for the resolution of the problem. The content of log file 314 can be customized via control program 312.

Control Program

Control program 312 controls the operation of the event collector. Control program 312 acts as an administrative console to start and stop the event collector 310 and allow the system administrator to view the current status of event collector 310 and any connected set top terminals or applications.

Control program 312 provides a mechanism for the system administrator to modify the behavior of event collector 310. Control program 312 uses RPC to communicate with event collector 310, allowing it to be run on any remote node.

In order to use the event collector subsystem, control program 312 must start event collector 310. Once event collector 310 has been started, applications can post events to the collector and register interest in events. These tasks are performed using the PostEvents API and the ReceiveEvents API.

Control program 312 communicates with event collector 310 via RPC, and can be run on any node with network connectivity to the event collector's node. Control program 312 supports the following commands:

| | |
|---|---|
| start | start event collector. |
| stop | stop event collector. |
| newlog | open a new 'ep.dat' log file. |
| status | show status of event collector. |
| list stts | list event posting applications currently connected to the collector. |
| stt | show information about one event posting application. |
| Listappls | list event handling applications currently connected to the collector. |
| appl | show information about one event handling application. |
| filter on | filter out one type of event. |
| filter off | remove a filter previously established with filter on. |
| List filters | list event types and filter values. |
| Log on | include this category of message in the 'ep.dat' log file. |
| Log off | exclude this category of message from the 'ep.dat' log file. |
| Listlogging | list status (on or off) of logging of each message category. |
| help | list these options. |
| exit | exit crontrol program. |

Event collector 310 generates an ascii file named 'ep.dat' into which it will write status information and diagnostics. If unexpected behavior occurs, 'ep.dat' can be examined to help determine the cause of the problem.

PostEvents API (api1)

The PostEvents Application Programming Interface ("API") 316 is used by applications that need to post events to event collector 310. For example, an application running at a set top terminal would use PostEvents API 316 to send events to event collector 310 running on a remote node.

PostEvents API 316 hides the details of the underlying interprocess communication mechanism (currently based on Sun RPC over UDP/IP). PostEvents API 316 allows the application to be constructed without knowledge of distribution. Further, it isolates the changes necessary in the event that a different interprocess communication mechanism is introduced.

PostEvents API 316 includes a variety of routines which may be used within an event posting application. These routines include:

ECSConnect( )

ECSConnect( ) is the first API call an application must make in order to post events to the event collector. This routine hides the details of the underlying interprocess communication (IPC) mechanism from the application. It creates an IPC connection to the event collector on the target node, and allows the event collector to create local context information about the calling application.

The prototype for ECSConnect( ) is as follows:

int ECSConnect(sttAddrT stt, char * serverNode, int buffSize);

The parameters passed to ECSConnect( ) are as follows:

| stt | a 32-bit value identifying the set-top terminal that will be posting events. |
|---|---|
| serverNode | address of a character string specifying the Unix node where the event collector is running. |
| buffSize | size of buffer to use. If 0, no buffering is used - every posted event will result in an IPC message to the event collector. Any other value less than kMaxEventGroupLen specifies the size of the buffer to use. The default buffer size is 1024 bytes. |

ECSPostEvent( )

An application uses ECSPostEvent( ) to post a single event to event collector 310. The posted event will be added to an event buffer. When the buffer fills up (or when sendNow is non-zero), the buffer will be transmitted to event collector 310.

The prototype for ECSPostEvent( ) is as follows:

int ECSPostEvent(eventSizeT eventSize, char *eventBuffer, int sendNow);

The parameters passed to ECSPostEvent( ) are as follows:

| eventSize | the size of the event located in eventBuffer, in bytes. |
|---|---|
| eventBuffer | address of a buffer containing a single event. If the event is located in a typed data structure, it can be passed via casting, e.g., (char *)&tevent. |
| sendNow | if non-zero, specifies that this event and any other events in the event buffer should be transmitted to the event collector immediately. Otherwise, events are buffered for transmission later, when the buffer fills up. Allows application a way to force immediate transmission of a high-priority event. |

ECSPostEventGroup( )

An application can use ECSPostEventGroup( ) if it performs its own buffering of events. The buffer of events will be immediately transmitted to the event collector.

The prototype for ECSPostEventGroup( ) is as follows:

int ECSPostEventGroup(int32T bufferSize, char *eventBuffer);

The parameters passed to ECSPostEventGroup( ) are as follows:

| bufferSize | the total size of all events in the eventBuffer, in bytes. |
|---|---|

| eventBuffer | address of a buffer containing one or more events. |
|---|---|

ECSDisconnect( )

An application should use ECSDisconnect( ) when it is done posting events to event collector 310. Use of ECSDisconnect( ) allows event collector 310 to clean up the state it maintains on a per-set top basis. A well-behaved application would invoke this routine prior to application exit (including installation of appropriate signal handling mechanisms to invoke the routine prior to abnormal termination or termination caused via Control-C, etc.).

The prototype for ECSDisconnect( ) is as follows:

int ECSDisconnect (void);

ECSDisconnect( ) does not require any parameters.

ReceiveEvents API (api2)

The ReceiveEvents API 318 is used by applications that need to receive and handle events. For example, IM2 applications such as OSS, DSS and error processing would use ReceiveEvents API 318 to receive notification of event occurrence from event collector 310 running on a remote node. ReceiveEvents API 318 has the same benefits with respect to transparency of distribution as PostEvents API 316. Applications use ReceiveEvents API 318 to register interest in specified event types. ReceiveEvents API 318 also provides a mechanism for the application to register entry points to be invoked by the API when those event types arrive.

Receivevents API 318 includes a variety of routines which may be used within an event handling application. These routines include:

ECAConnect( )

ECAConnect( ) is the first API call an application must make in order to register interest in events and subsequently receive events from event collector 310. This routine hides the details of the underlying SUN RPC communication mechanism from the application. It creates an RPC connection to the event collector on the target node and sets the application up to receive events dispatched by the event collector to the application.

The prototype for ECAConnect( ) is as follows:

int ECAConnect(char *serverNode, char *applName, int buffSize);

The parameters passed to ECAConnect( ) are as follows:

| serverNode | address of a character string specifying the Unix node where the event collector is running. |
|---|---|
| applName | address of a character string specifying the name of the calling application, e.g. "Event Handler", "OSS Functions", "KeyPress Shadower", etc. |
| buffSize | size of buffer to use. If 0, no buffering is used - every event dispatched by the event collector to the application will be immediately transmitted to the application. Any other value specifies the size of the buffer to use. The default buffer size is 8192 bytes. |

ECARegisterInterest( )

An application uses ECARegisterInterest( ) to register interest in a single event type, and to specify a routine to be invoked by the ECA API when events of that type are dispatched to the application. The application must call ECARegisterInterest( ) once for each event type of interest. Currently, the registration of interest applies to all set tops connected to the event collector. In the future, if warranted, the API may be modified to support registration of interest in a subset of the set tops connected to the event collector.

The prototype for ECARegisterInterest( ) is as follows:

int ECARegisterInterest(eventTypeT eventType, int (*handler) (sttAddrT, TEvent*));

The parameters passed to ECARegisterInterest( ) are as follows:

| eventType | type of event the application is interested in. Possible event types are specified in the include file Events.h. |
|---|---|
| handler | address of a routine to handle events of the specified type when they arrive. This routine takes two parameters. The first is of type sttAddrT, and specifies the set-top that generated the event. The second is of type TEvent*, and is the address of the event itself. The routine returns an integer value (but the ECA API does not currently examine the return value). The macro ECA_HANDLER_CAST is provided for use by applications when specifying the address of this routine as an argument to ECARegisterInterest (). |

It is important to note that an application may use either ECARegisterInterest( ) or ECARegisterInterestObject( ), but not both.

ECARegisterInterestObject( )

ECARegisterInterestObject( ) provides the same functionality as ECARegisterInterest( ), but is intended for use by applications that would like an object method to be invoked when an interesting event arrives, as opposed to having a regular function invoked.

The ECACallbackHandler object is provided for use as a base object defining the method names and method parameters required to handle incoming events. Applications wishing to use this API routine must derive an object from the ECACallbackHandler object, providing implementations of the pure virtual functions specified by ECACallbackHandler.

The prototype for ECARegisterInterestObject( ) is as follows:

int ECARegisterInterestObject(eventTypeT eventType, ECACallbackHandler *handler)

The parameters passed to ECARegisterInterestObject( ) are as follows:

| eventType | type of event the application is interested in. Possible event types are specified in the include file Events.h. |
|---|---|
| handler | address of an object derived from the ECACallbackHandler class. This object must provide an implementation of the method associated with the specified event type. |

It is important to note that an application may use either ECARegisterInterest( ) or ECARegisterInterestObject( ), but not both.

ECAAwaitEvents( )

Once the application has registered interest in events and provided the API with routine entry point addresses to invoke when events arrive, it must call ECAAwaitEvents( ). ECAAwaitEvents( ) does not immediately return control to the application. Instead, it waits for a buffer of incoming events to arrive, and then parses the buffer, invoking the callback routines (or methods) specified by the application when it registered for interest in events. Once all events in the buffer are processed, ECAAwaitEvents( ) resumes waiting for a buffer of events to arrive.

ECAAwaitEvents( ) returns control to the application in the following circumstances. First, if the application receives a signal, then ECAAwaitEvents( ) will return, with the value returned being the number of the signal received. Second, if the event collector shuts down, then ECAAwaitEvents will terminate with the status ECA_EVENT_COLLECTOR_SHUTDOWN. Third, ECAAwaitEvents( ) will exit if the application invokes ECAAwaitEventsExit( ) from within the idle-time callback routine or from within one of the event handling callback routines or methods. In this case, ECAAwaitEvents( ) will return the value specified on the ECAAwaitEventsExit( ) call.

The prototype for ECAAwaitEvents( ) is as follows:

int ECAAwaitEvents(int secondsToWait, void (*idleTimeCallback) ( ));

The parameters passed to ECAAwaitEvents( ) are as follows:

| secondsToWait | number of seconds to block within the select() system call, waiting for incoming RPCs to arrive. Large values will allow the application to be more responsive to incoming events. Small values will allow any specified idleTimeCallback routine to be invoked more often, but may result in slower response to incoming events. Specifying zero, with a non-NULL value for idleTimeCallback, effectively implements polling (not recommended, very inefficient) |
|---|---|
| idleTimeCallback | address of an application-provided function to be invoked by the ECA API after every set of incoming RPCs has been processed. This routine takes no arguments and does not return a value. An application can use this value to specify a routine to be called during lulls in event arrival. |

ECAAwaitEventsExit( )

The application can use ECAAwaitEventsExit( ) to terminate the wait for incoming events and force ECAAwaitEvents( ) to return. The application can invoke this routine from within the idleTimeCallback routine specified on the ECAAwaitEvents( ) call, or from any of the event handling callback routines or methods specified on the ECARegisterInterest( ) or ECARegisterInterestObject( ) calls.

The prototype for ECAAwaitEventsExit( ) is as follows:

void ECAAwaitEventsExit(int status)

The parameter passed to ECAAwaitEvents( ) is as follows:

status value that should be returned by ECAAwaitEvents( ).

ECAAwaitEventsExit( ) does not return a value.

ECADisconnect( )

The application must invoke ECADisconnect( ) when it is done handling events. ECADisconnect( ) notifies the event collector that it can clean up the state it maintains on a per-application basis. A well-behaved application should call ECADisconnect( ) before it exits (this includes invocation of ECADisconnect( ) from within signal handlers and Control-C handlers, etc).

The prototype for ECADisconnect( ) is as follows:

int ECADisconnect( )

ECADisconnect( ) does not take any parameters.

EventGenerator Application

The EventGenerator application is a test application designed to provide a load for event collector 310. This allows event collector 310 to be tested before the existence of broadband-based connectivity between set top terminals and event collector 310. It also allows PostEvents API to be debugged. EventGenerator application generates a random stream of events. The application is parameterized to allow a delay to be introduced between generated events. Running multiple instances of the EventGenerator on the same or different nodes allows event collector 310 to be load tested.

EventLogSender Application

The EventLogSender application is another test application used to post events to event collector 310. The EventLogSender application is able to read event logs captured on the Mac when the 3DO system runs the ISIS Framework application. This application allows a semantically-correct event stream to be sent to event collector 310, as opposed to the random, nonsensical stream produced by the EventGenerator application.

EventHandler Applications

The EventHandler applications utilize ReceiveEvents API 318 to register interest in one or more event types. The applications register appropriate entry points to receive incoming events. They simply print out the contents of received events.

Incorporation of IPC Classes

A C++ class hierarchy implementing interprocess communication has been developed. The intent of this hierarchy is to allow a distributed application to be written in a manner that is entirely independent of the underlying communications mechanism.

In this manner, it is possible to quickly and easily convert from using Sun RPC for interprocess communication to using Unix sockets, OSF's DCE RPC, General Magic's Telescript RPC, shared memory or other communication protocol. Currently, the IPC class hierarchy supports Sun RPC and Unix socket implementations.

While the best mode for carrying out the invention has been described in detail, those familiar with the art to which this invention relates will recognize various alternative designs and embodiments for practicing the invention as defined by the following claims.

What is claimed is:

1. In an interactive network including a server and a plurality of client stations, the server including a memory and a processor having event processing control logic, a method for automatically collecting event data from a multimedia application at a client station with the server, the method comprising:

identifying an event of a multimedia application at a first client station;

transmitting, from the first client station, an event data signal representing the event;

receiving the event data signal with the server;

processing the event data signal with the event processing control logic of the server to determine if the event is of interest to the server;

storing the event data signal in the memory of the server if the event is of interest to the server;

registering an interest of a second client station in the event with the server;

processing the event data signal stored in the memory of the server with the event processing control logic of the server to determine if the event is of interest to the second client station;

transmitting the event data signal from the server if the second client station is interested in the event; and receiving the event data signal with the second client station.

2. The method of claim 1 further comprising:

receiving an input signal from an input device of the first client station to identify an event of a multimedia application at the first client station.

3. The method of claim 1 wherein:

the interactive network is an interactive television network.

4. In an interactive network including a server and a plurality of client stations, the server including a memory and a processor having event processing control logic, a method for automatically delivering event data from a server to a multimedia application at a client station, the method comprising:

identifying an event of a multimedia application at a first client station;

transmitting, from the first client station, an event data signal representing the event;

receiving the event data signal with the server;

storing the event data signal in the memory of the server;

registering an interest of a second client station at the server, wherein the interest of the second client station is indicative of the second client station being interested in the event;

processing the event data signal stored in the memory of the server with the event processing control logic of the server to determine if the event is of interest to the second client station;

transmitting, from the server, the event data signal stored in the memory of the server representing the event if the second client station is interested in the event; and receiving the event data signal with the second client station.

5. The method of claim 4 further comprising:

receiving an input signal from an input device of the second client station to register an interest in an event of a multimedia application.

6. The method of claim 4 wherein:

the interactive network is an interactive television network.

* * * * *